United States Patent [19]
Hahn et al.

[11] Patent Number: 5,924,674
[45] Date of Patent: Jul. 20, 1999

[54] MICROVALVE AND METHOD FOR MANUFACTURING A MICROVALVE

[75] Inventors: Dietmar Hahn, Gerlingen; Heinz Fuchs, Stuttgart; Gottfried Flik, Leonberg; Thomas Schittny, Steinheim; Alexandra Jauernig, Leonberg, all of Germany

[73] Assignee: Robert Bosch GmbH, Stuttgart, Germany

[21] Appl. No.: 08/793,427

[22] PCT Filed: May 30, 1996

[86] PCT No.: PCT/DE96/00939

§ 371 Date: Feb. 21, 1997

§ 102(e) Date: Feb. 21, 1997

[87] PCT Pub. No.: WO97/02433

PCT Pub. Date: Jan. 23, 1997

Related U.S. Application Data

[30] Foreign Application Priority Data

Jun. 30, 1995 [DE] Germany .................. 1 9523 915

[51] Int. Cl.[6] ............................................ F16K 31/02
[52] U.S. Cl. .................. 251/129.01; 251/129.16
[58] Field of Search .................. 251/129.01, 129.06, 251/129.15, 129.16

[56] References Cited

U.S. PATENT DOCUMENTS

| | | | |
|---|---|---|---|
| 4,647,008 | 3/1987 | Shirai et al. | 251/129.15 X |
| 5,217,200 | 6/1993 | Hutchings et al. | 251/129.15 X |
| 5,238,223 | 8/1993 | Mettner et al. | 251/129.06 X |
| 5,271,823 | 12/1993 | Schachameyer et al. | 205/224 |
| 5,629,583 | 5/1997 | Lipphardt et al. | 257/254 |

*Primary Examiner*—Kevin Lee
*Attorney, Agent, or Firm*—Kenyon & Kenyon

[57] ABSTRACT

The microvalve according to the invention is comprised of an electromagnetic drive and of a multilayer lower valve part, which are permanently bonded to one another and are manufactured separately from one another. The lower valve part includes at least one armature and a valve-closure element, which are axially movable, as well as a housing which at least partially surrounds this axially movable component of the microvalve. The layers of the lower valve part are built up one upon the other by means of (multilayer) electrodeposition. The microvalve can be used in fuel-injection systems of internal combustion engines.

10 Claims, 7 Drawing Sheets

MICROVALVE AND METHOD FOR MANUFACTURING A MICROVALVE

FIELD OF THE INVENTION

The present invention relates to a microvalve and to a method for manufacturing a microvalve.

BACKGROUND INFORMATION

A microvalve of bonded layers is described in German Patent Application No. 42 21 089, which describes a microvalve having three components placed one over one another as stacked layers. These components are composed of plastic material or aluminum. The closing element of the microvalve is made of a molded plastic, which contains metallic powder and is composed of several layers. To manufacture the valve, plastic molding processes are used, in particular injection molding or embossing (punching) to produce the structures. The strength or the chemical resistivity of the plastics employed is not always optimally adapted to the given work environments.

SUMMARY OF THE INVENTION

One of the advantages of the microvalve according to the present invention is that the microvalve can be manufactured cost-effectively and in a simple manner using metal. Thus, all the positive properties of metal are attained for the microvalve. The individual, metallic, electrodeposited components of the microvalve can be produced with narrower tolerances and, at the same time, with lower manufacturing costs than has been possible in the manufacturing of microvalves in conventional methods heretofore.

Another advantage of the microvalve according to the present invention is that there is no compensation of the forces and torques acting on the valve-closure element, as occur when working with conventional microvalves. Otherwise, conventional pressure-compensated microvalves have large, highly stressed membranes.

The design of the pressure-compensated microvalve according to the present invention yields the advantage that no mechanically, highly stressed membrane is needed as a structural element. The need has been eliminated for mutual dependency of the valve lift, of the fluid pressure to be controlled (switched) and of the lateral dimensions (dimensions in the x-, y-direction) of the microvalve. As a result, variants can be manufactured which feature a small volumetric flow and a large valve lift.

It is further advantageous that different atomizer structures are able to be integrated very simply with the galvanic metal deposition (electrodeposition) on the microvalve. Thus, metallic layers, which in the end make up an "S-type spray-orifice plate" or an annular-gap nozzle, can be easily deposited. Such a galvanically deposited annular-gap nozzle on the microvalve renders possible a very uniform and fine atomization of the fluid. To this end, the annular-gap nozzle has at least one continuous annular gap, so that the fluid to be spray-discharged forms a cohesive, annular, jet lamella downstream from the annular gap. Further downstream, as its diameter increases, this lamella disintegrates into very small droplets.

When S-type spray-orifice plates are used on the microvalve, besides an excellent atomization quality, exceptional, bizarre jet shapes can be advantageously produced. When working with single-, dual- and multi-jet sprays, these orifice plates render possible countless variations of jet cross-sections, such as rectangles, triangles, cross shapes, and ellipses. Such unusual jet shapes enable a precise and optimal adaptation to predefined geometric dimensions, e.g., when the microvalve is employed as a fuel injector, to different induction pipe cross-sections of internal combustion engines.

Compared to macroscopic injectors, the small unit volume, the smaller power requirement of the drive, and the shorter switching time are advantageous.

One of the advantages of the method according to the present invention for manufacturing a microvalve is that microvalve parts are able to be manufactured reproducibly, with great precision, cost-effectively, and simultaneously in very large quantities, because of their metallic construction, these microvalve parts being unbreakable and being able to be installed very simply and inexpensively by means of bonding, soldering or welding on other valve components, such as pot magnets. The process steps according to the present invention allow considerable design freedom, since the contours can be freely selected for the most part. Methods, such as UV depth lithography, dry-etching, or ablation by means of micro-electroplating (electrodeposition out of aqueous electrolytes) are advantageously combined to deposit thin metallic layers, each time with new structures (patterns), on one another. The process according to the present invention suited for building up two, three or more layers to form a microvalve.

It is further advantageous for two layers of the microvalve to be built up in one electrodeposition step, the "lateral overgrowth" action of the electroplating being utilized. With the additional application of a galvanic starting layer and a new photoresist layer, the growing of the metal is continued selectively over the photoresist pattern of the preceding layer. A clear savings in costs and time is achieved with the aid of the lateral overgrowth.

DETAILED DESCRIPTION

Figure 1:
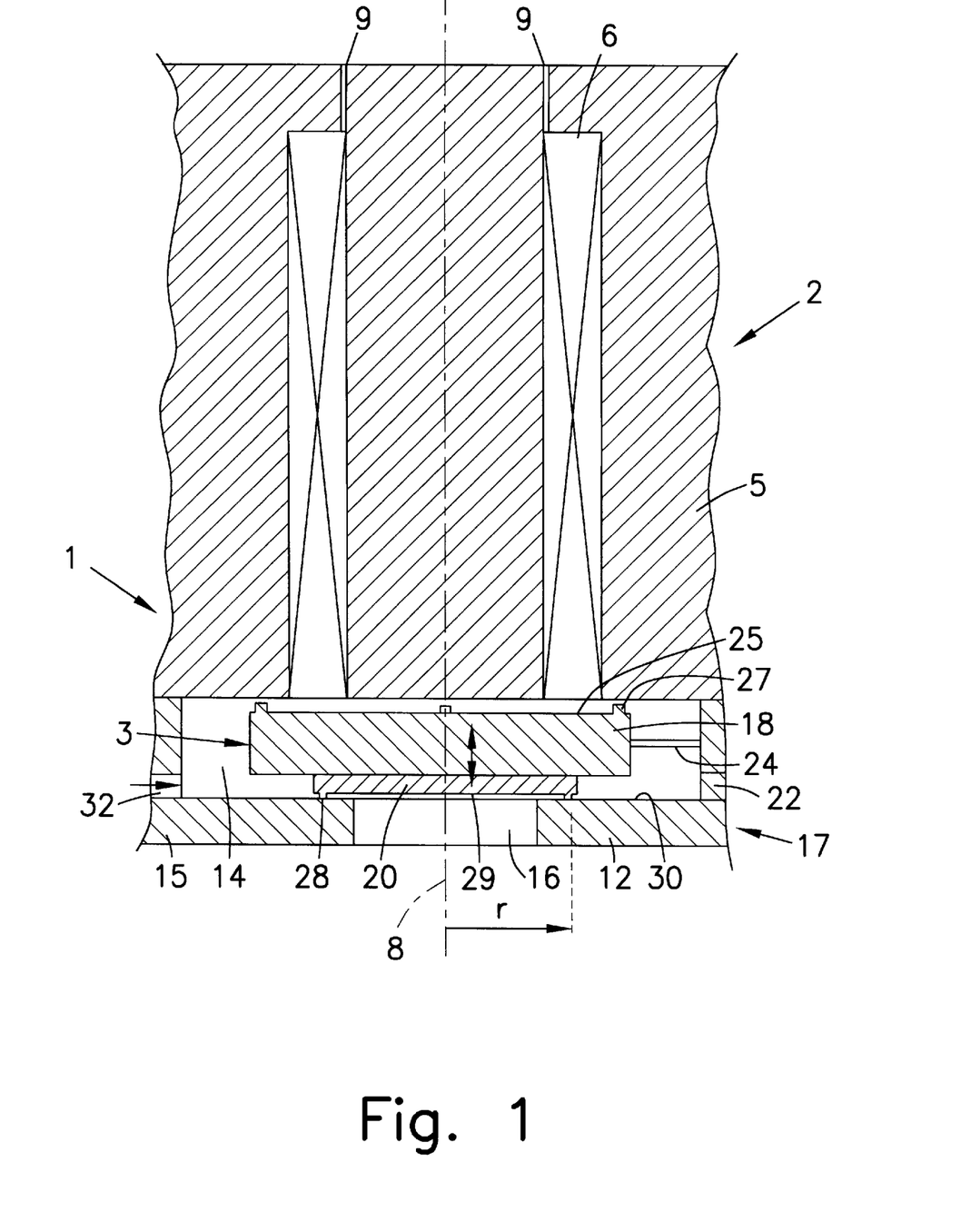
FIG. 1 shows a section through a first microvalve according to the present invention.

Microvalve 1 shown cross-section in FIG. 1 generally includes two cooperative basic components:

Microvalve 1 depicted in cross-section in FIG. 1 is mainly comprised of two cooperating basic components, of an electromagnetic drive 2 for actuating microvalve 1, and of a lower valve part 17 including an actuating part 3 that performs the valve function. Drive 2 is includes, for example, a cylindrical pot magnet 5, in which a soilenoid coil 6 is integrated. Solenoid coil 6 formed concentrically around a longitudinal valve axis 8 is completely surrounded, radially to the inside and outside, by pot magnet 5. Running, for example, out of microvalve 1, on the side of microvalve 1 facing opposite actuating part 3, are two coil connections 9 which ensure that current is supplied to solenoid coil 6.

Since pot magnet 5 does not have any moving, sealing parts in the upper part of microvalve 1, it can be produced using precision manufacturing methods with relatively few tolerance requirements, such as punching, embossing, powder-injection molding, cutting-machining steps, erosion techniques, or metal-injection molding (MIM) methods. A conventional metal-injection molding method is a viable alternative for producing pot magnet 5 and entails the manufacturing of molded parts from a metal powder using an adhesive agent, e.g., a plastic adhesive agent, on conventional plastic-injection molding machines, and the subsequent removal of the adhesive agent and sintering powder of the residual powder-metal framework. The composition of the metal powder can thereby be simply matched to the desired, optimal magnetic properties of pot magnet 5.

Solenoid coil 6 can be manufactured as a conventionally wound coil including one or more turns, as a stamping, or using a multi-layer thin or thick laminate structure. When a solid coil comprised of one turn is provided, it can also be pressed in the form of a metal strip into pot magnet 5. Thus, solenoid coil 6 and pot magnet 5 are provided with a wear-resistant, insulating layer. Pot magnet 5, provided with soilenoid coil 6, is assembled with a housing 12 of lower valve part 17, which substantially and radially surrounds actuating part 3 on the side facing away from pot magnet 5, using, e.g., bonding, welding, or soldering methods. Thus, housing 12 has a pot- or saucer-shaped design and, consequently, has an open area 14, in which actuating part 3 is embedded. A base plate 15 of housing 12 forming the downstream axial termination of microvalve 1 has an outlet orifice 16, which is formed concentrically to longitudinal valve axis 8 and communicates directly with opening area 14. Together with actuating part 3, housing 12, inclusive of base plate 15 and possibly integrated orifice plates or nozzle plates on base plate 15, forms lower valve part 17. Pot magnet 5, with its outer boundary edge, constitutes part of the overall housing of microvalve 1.

Actuating part 3 arranged in open area 14 of housing 12 includes two permanently joined metallic layers, the layer facing pot magnet 5 constituting a plate-shaped armature 18 having a circular cross-section and the layer pointing toward base plate 15 representing a disk-shaped valve-closure element 20. The magnetically soft armature 18 has, for example, a larger diameter, as well as a larger axial extent (thickness) than valve closure element 20. Together, these two elements making up actuating part 3 fill in open area 14 by about ¾. Given an overall diameter of microvalve 1 of, for example, 10 to 12 mm, armature 18 has, for example, a diameter of 7.5 mm and valve-closure element 20, for example, a diameter of 5.5 mm. The thicknesses of the metal layers, thus of armature 18, of valve-closure element 20, and of base plate 15 usually lie within the range of 0.1 to 1 mm. These size indications pertaining to the dimensions of microvalve 11, as well as all other dimensions indicated herein are given to further understanding and in no way restrict the insert.

Actuating part 3 is directly coupled to housing 12, since web-and plate-like spring elements 24 are provided between an annular inner wall 22 of housing 12 extending between pot magnet 5 and base plate 15, and armature 18. The three spring elements 24, e.g., disposed at 1200 intervals from one another and running radially through open area 14 have, for example, a thickness of 0.1 mm and a width of 0.5 mm. The length of spring elements 24 is automatically given by the dimensions of armature 18 and inner wall 22. Stop knobs 27, which hit against pot magnet 5 when microvalve 1 is open, are formed on one top front end 25 of armature 18 facing pot magnet 5. Three or four of these stop knobs 27, for example, are expediently provided on armature 18. A sealing ring (gasket) 28, which projects out from a bottom end face 29 of disk-shaped valve-closure element 20 and represents the actual valve-closure element, runs on valve-closure element 20 and points toward base plate 15. Sealing ring 28 is formed as a circumferential, annular elevation of valve-closure element 20 that is small in width. A top end face 30 of base plate 15 represents a valve-seat surface area, at least in the area of sealing ring 28 of valve-closure element 20 that corresponds to base plate 15.

The fluid to be controlled,(or switched) e.g., a fuel such as gasoline, is forced via one or more, e.g., radially running channels 32 in inner wall 22, which serve as an inlet for a fluid, in accordance with the indicated arrow direction, into the high-pressure section, i.e., into open area 14 of microvalve 1. If the valve is actuated, then the electromagnetic drive 2 exerts an attractive force on actuating part 3. Sealing ring 28 is lifted up from valve-seat surface area 30, and microvalve 1 releases a fluid flow to outlet orifice 16 of microvalve 1. Armature 18 then strikes with its stop knobs 27 against pot magnet 5. The lift of actuating part 3 is given by the height of open area 14 and of stop knobs 27, which, therefore, delimit the lift. Moreover, stop knobs 27 prevent armature 18 from adhering to pot magnet 5. After pot magnet 5 has been interrupted, armature 18, together with valve-closure element 20, is moved by the fluid in open area 14 and spring elements 24 in the direction of valve-seat surface area 30, and microvalve 1 is closed. Thus, the path between the two described end positions of actuating part 3 represents the lift. The opening and closing travel of actuating part 3 is marked by an axially running double arrow. The closing force acting on armature 18 is the spring resilience of spring elements 24 plus a hydraulic force F, which is equal to the pressure difference $\Delta p$ between open area 14 and the valve outlet, multiplied by the surface A of the valve outlet ($F = \Delta p \times \pi r^2$). The entire microvalve 1 has, e.g., an axial extent of 10 to 15 mm and is, therefore, very compact and requires only a very small installation space. When microvalve 1 is used, e.g., as a fuel injector on internal combustion engines, compared to conventional injectors presently used the result is an installation space that is reduced several times over to about 1/3 to 1/10.

Figure 2:
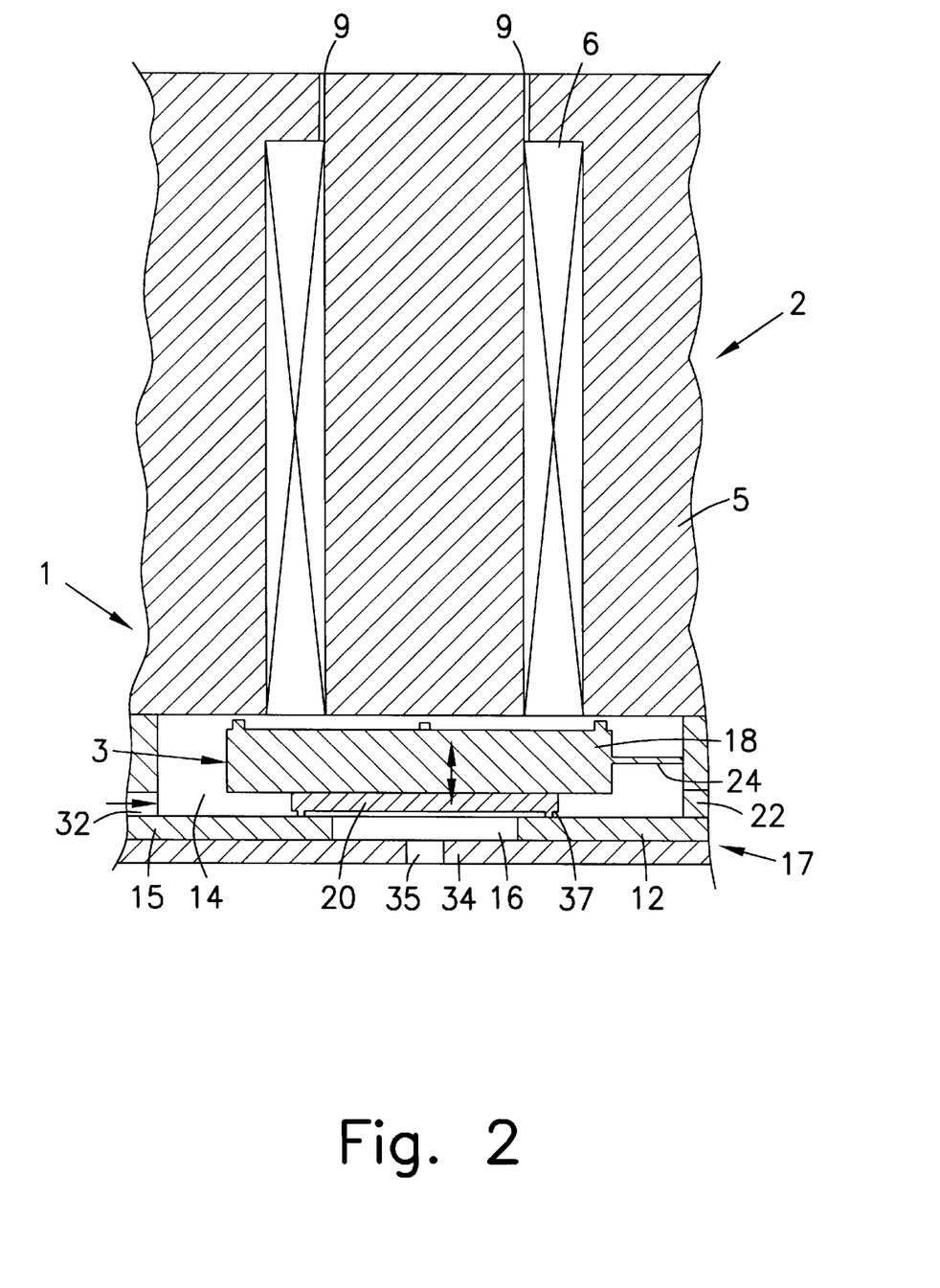
FIG. 2 shows a section through a second microvalve.

In the additional exemplary embodiments of FIGS. 2–8 the parts that have remained the same or that have the same function as in the exemplary embodiment described in FIG. 1 have the same reference numerals. FIG. 2 shows a microvalve 1, which differs from the microvalve shown in FIG. 1 in the area of base plate 15. Base plate 15, for example, has been supplemented at the downstream end of microvalve 1, with an additional metallic layer that constitutes a spray-orifice plate 34. In its central area situated next to longitudinal valve axis 8, spray-orifice plate 34 has at least one, and typically four spray orifices 35, which are contiguous to outlet orifice 16 of base plate 15. Spray-orifice plate 34 can be part of the one-layer base plate 15 and, thus, be integrated in housing 12, or constitute an autonomous layer in addition to base plate 15, or completely replace base plate 15 and, thus, also have valve-seat surface area 30. The surface area of an opening gap 37, which results between valve-seat surface area 30 and sealing ring 28, given an open microvalve 1, is two to four times as large as the sum of the cross-sectional areas of spray orifices 35 of spray-orifice plate 34. When microvalve 1 is open, the following pressure distribution adjusts itself. The system pressure of microvalve 1 is applied in open area 14; a portion of the pressure drops at opening gap 37, and the main portion of the pressure drops at the at least one spray orifice 35. The pressure difference between the high-pressure portion of microvalve 1 and the space between opening gap 37 and spray orifices 35 is great enough to ensure a reliable closing of microvalve 1.

Figure 3:
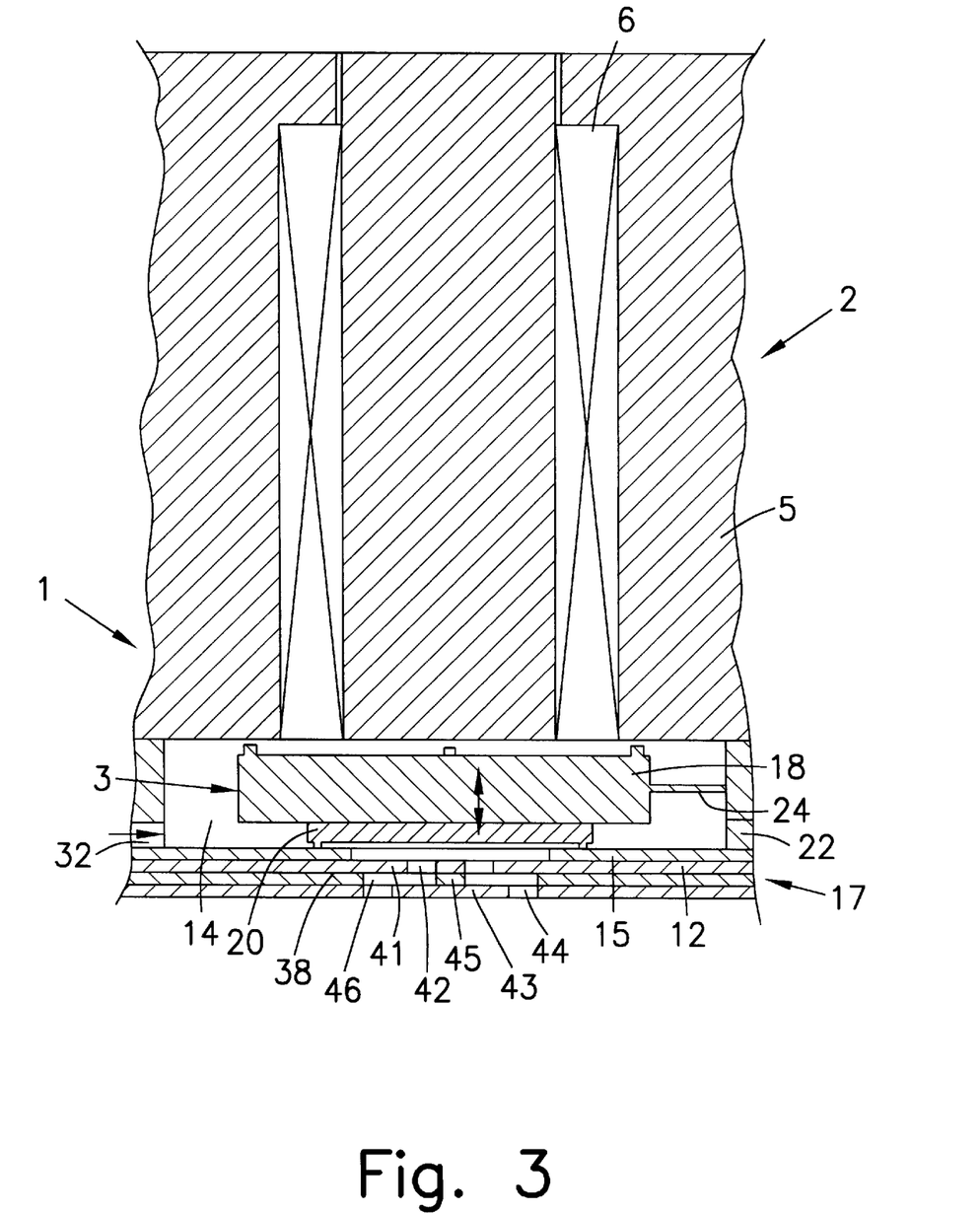
FIG. 3 shows a section through a third microvalve having an S-type spray-orifice plate.

One of the distinguishing features of microvalve 1 shown in FIG. 3 is that a modified spray-discharge region is provided in the area of base plate 15. Base plate 15 is designed, for example, in the form of a flat, circular, multi-layer plate (multilayer spray-orifice plate 38). Similarly to the preceding exemplary embodiment shown in FIG. 2, spray-orifice plate 38 may constitute part of base plate 15 or replace base plate 15 in the sense that spray-orifice plate 38, itself, constitutes the entirety of the base of microvalve 1. In the exemplary embodiment shown in FIG. 3, spray-orifice plate 38 is designed as an "S-type plate", i.e., the inlet and outlet orifice in spray-orifice plate 38 are disposed in a staggered arrangement, which creates an "S-impact" in the flow of the fluid flowing through spray-orifice plate 38. The process steps in accordance with the present invention for manufacturing microvalve 1 and, in particular, spray-orifice plate 38 produce a structure which is composed of a plurality of layers. The manufacturing method will be described in greater detail below.

Spray-orifice plate 38 is produced, e.g., from three metallic layers using electrodeposition methods. The depth-lithographic, electroplating manufacturing results in the following profiling features:

layers having a substantially constant thickness over the entire plate surface area;

due to the depth-lithographic patterning, substantially vertical notches in the layers, which each form the cavities that are traversed by flow;

desired undercuts and overlapping of the notches because of the multi-layer structure of the individual, patterned metal layers;

notches with any desired cross-sectional shapes, such as rectangle, polygon, rounded rectangle, rounded polygon, ellipses, circle, etc., that have substantially axis-parallel inner walls.

The individual layers are electrodeposited one after another, so that the succeeding layer adheres permanently to the subjacent layer because of galvanic electroplating bonding.

It is customary for spray-orifice plate 38 to have a top layer 41 with four inlet orifices 42, a bottom layer 43 with four outlet orifices 44 and, for example, a middle layer 45 situated between layers 41 and 43. Inlet orifices 42 are disposed, e.g., in the vicinity of longitudinal valve axis 8, while outlet orifices 44 are spaced further away from longitudinal valve axis 8 and, thus, are offset radially from inlet orifices 42. Four radially running channels 46, which form a direct connection between inlet orifices 42 and outlet orifices 44, extend in middle layer 45. Channels 46 are sized so as to just cover inlet orifices 42 and outlet orifices 44 in the drawing projection. Besides being radially offset, inlet orifices 42 and outlet orifices 44 can also be additionally offset in the circumferential direction.

The "S-impact" within spray-orifice plate 38, along with a plurality of vigorous flow deflections, causes a substantial, atomization-promoting vorticity to be impressed upon the flow. The velocity gradient transversely to the flow is especially pronounced as a result. It expresses the change in the velocity transversely to the flow, the velocity in the middle of the flow being perceptibly greater than near the inner walls. The elevated shear stresses in the fluid promote the disintegration into fine droplets at outlet orifices 44. Since the flow in the outlet is separated on one side because of the radial flow component impressed upon the fluid through channels 46, it does not experience any calming effect because of the lack of contour guidance. The fluid at the separated side experiences an especially high velocity, while the velocity of the fluid on the side of outlet orifices 44 falls off with applied flow. Thus, the atomization-promoting vorticities and shear stresses are not dissipated upon emergence.

Many variations of spray-orifice plates 38 in the form of S-type plates are possible. Thus, instead of channels 46 joining in each case one inlet orifice 42 with one outlet orifice 44 in middle layer 45, it is conceivable to have only one contiguous, e.g., annular or square channel 46. All inlet orifices 42 would then lead into this channel 46, and all outlet orifices 44, in turn, out of channel 46. Inlet orifices 42 and outlet orifices 44 can be offset from one another to the extent desired. The jet direction and the degree of vorticity can be regulated or adjusted based on the size of the offset. Besides the typical square or rectangular cross-sections of inlet orifices 42, outlet orifices 44 and channels 46, other cross-sectional geometrical shapes can be easily produced, such as rounded-off rectangles or squares, circles, circular segments, ellipses, ellipse segments, polygons, etc. The design of inlet orifices 42 and outlet orifices 44 can be varied on a spray-orifice plate 38. Suitable cross-sectional variations would be, for example, a transition from a square to a rectangle and vice versa, from a rectangle to a circle and vice versa, from an ellipse to a circle and vice versa. It is also easily possible for inlet orifices 42 and outlet orifices 44 to have different orifice widths.

Figure 4:
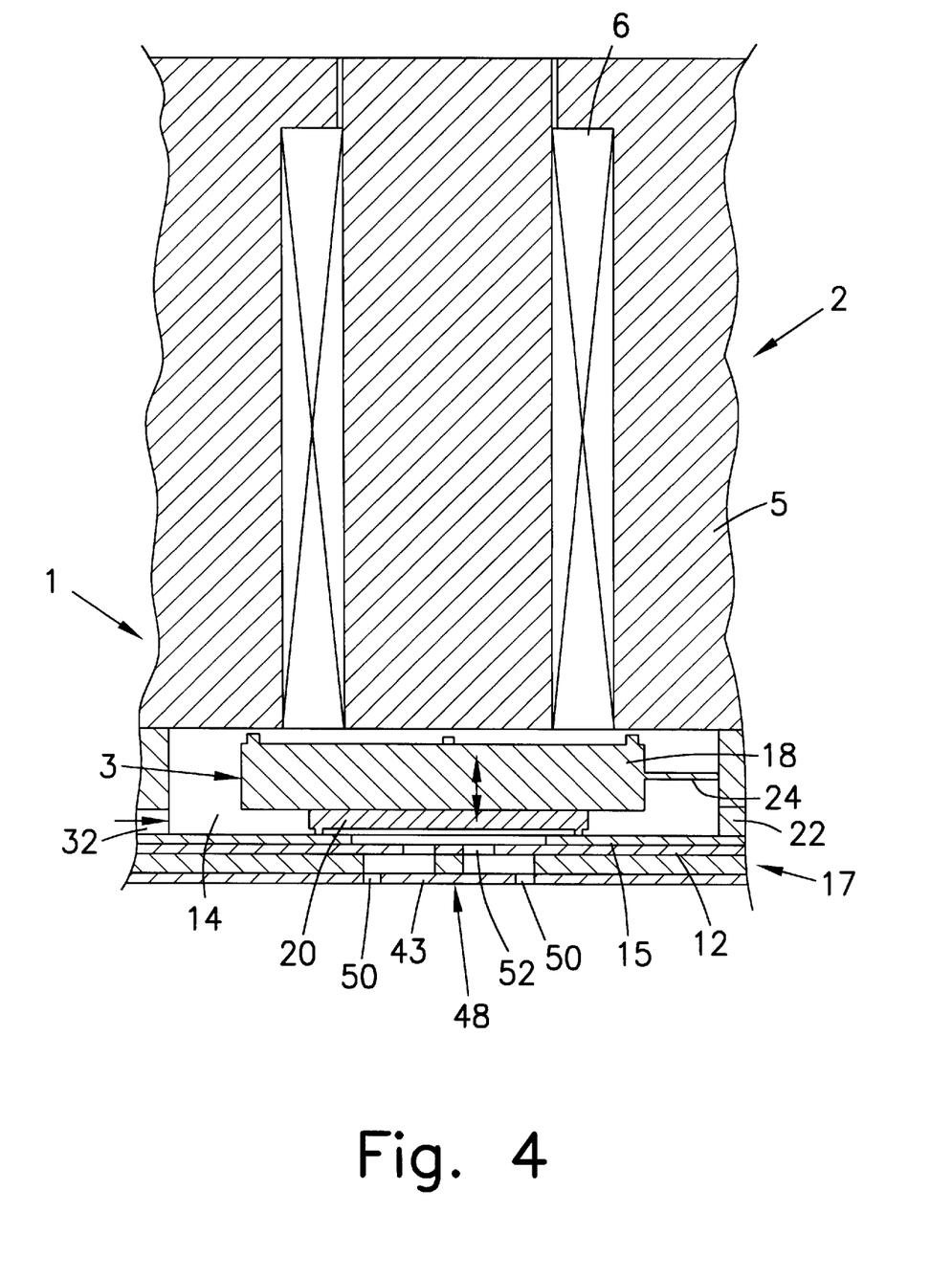
FIG. 4 shows a section through a fourth microvalve having an annular-gap nozzle.

Microvalve 1 shown in FIG. 4 has an annular-gap nozzle 48 integrated in base plate 15. Annular-gap nozzle 48 differs primarily from the previously described spray-orifice plate 38 in the area of fluid outflow. Instead of a plurality of outlet orifices 44 in base plate 15, annular-gap nozzle 48, which in the same way as spray-orifice plate 38 has a three-layer design, has in bottom layer 43 a narrow annular gap 50 which is not interrupted over the periphery. In this case, annular gap 50 has a substantially larger diameter than does an annular opening 52 in the top layer 41 of annular-gap nozzle 48. Annular opening 52 can also be replaced by a plurality of inlet orifices 42 in conformance with the arrangement in spray-orifice plate 38 (FIG. 3). In middle layer 45, in turn, at least one channel 46 is provided, which establishes a connection between annular opening 52 and annular gap 50.

Annular gap 50 enables thin, fluid, hollow lamellae to be spray-discharged, these hollow lamellae thinning out in the downstream direction behind microvalve 1. This thinning action is promoted by a corresponding increase in the lamellae circumference resulting from their tulip-shape. The free jet surface continues to increase in this manner, and the lamellae disintegrate into correspondingly smaller droplets. Moreover, the droplet packing density decreases with an expanding lamella cross-section, so that it is less likely that droplets recombine in the fuel spray to form larger drops (droplet coagulations). The lamellae disintegrate starting at a defined axial distance from annular gap 50. Because of aerodynamic reciprocal actions with the gas surrounding the lamellae, the lamella surface becomes more and more rippled (Taylor vibrations) as the distance to annular-gap nozzle 48 increases. The instability inherent in the lamellae becomes greater and greater with an increasing distance from annular gap 50 until a point where there is an abrupt disintegration into very small droplets. The advantage of this arrangement is that besides the ripple effect produced in the lamellae, virtually no other disturbances occur. Thus, for example, undesired local thickened areas, i.e., "strands" are avoided in the lamella that is thinning out in the downstream direction.

It is imperative that the lamella remain uninterrupted over its circumference. Otherwise, two free lamella ends will form at a lamella parting spot and merge in accordance with the physics of the surface tension to form a thick bulge. This results in larger drops or strands at these spots. Besides, a lamella interruption means that the tulip-shaped lamella profile is disturbed.

Figure 5:
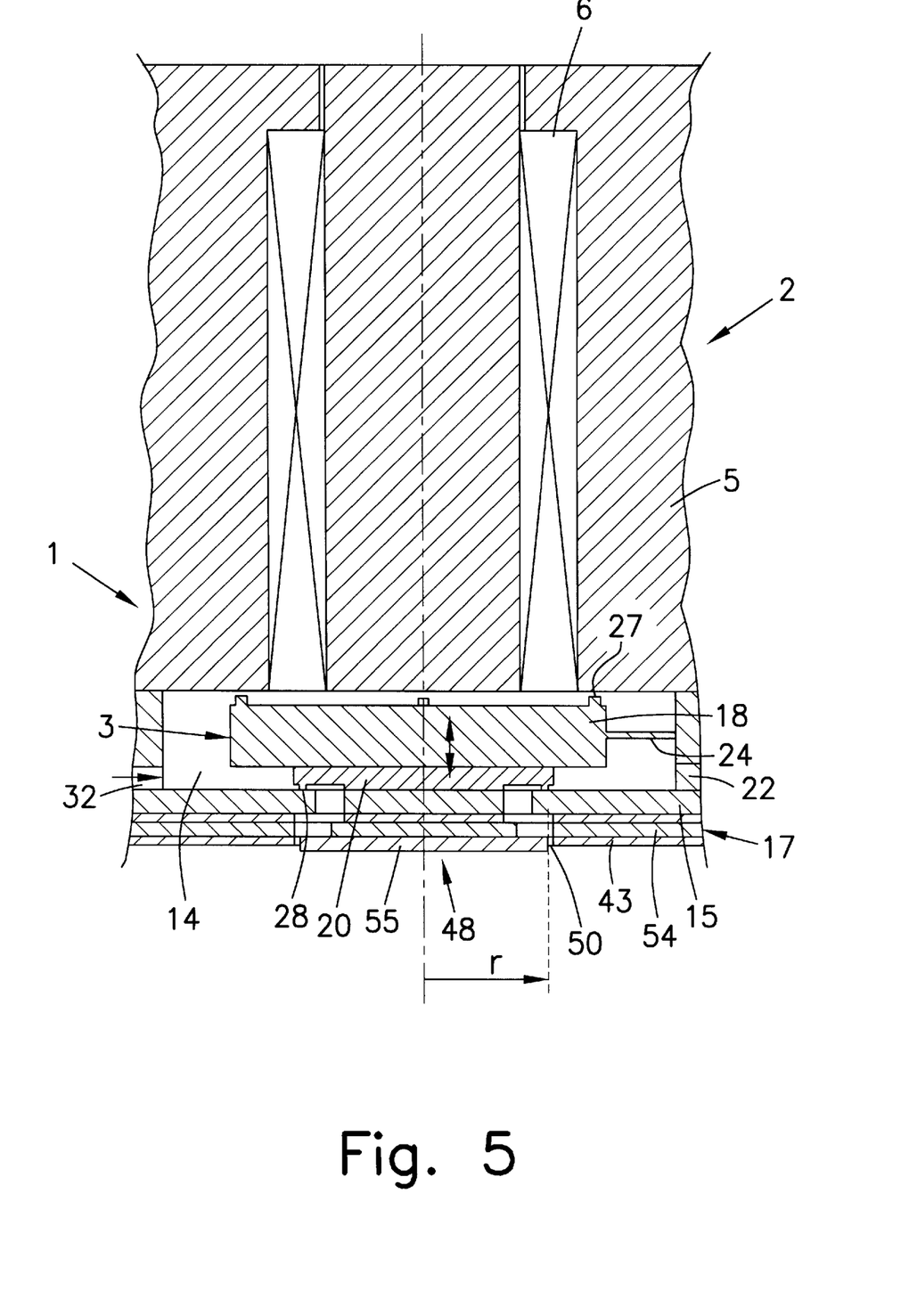
FIG. 5 shows a section through a fifth microvalve having a movable annular-gap nozzle.

The advantages of annular-gap spray discharging indicated above also apply to an embodiment of the present invention illustrated in FIG. 5. In this microvalve 1, multi-layer base plate 15 or annular-gap nozzle 48 has a divided form. An outer annular region 54 is permanently joined as a part of housing 12 to inner wall 22 and to pot magnet 5. On the other hand, an inner nozzle region 55 is completely separate from outer annular region 54, nozzle region 55, however, being part of movable actuating part 3. Thus, when microvalve 1 is opened and closed, nozzle region 55 participates in the lifting movement of valve-closure element 20. Both the outer contour of nozzle region 55, as well as the inner contour of annular region 54 have, for example, a stepped design, the flow cross-section between nozzle region 55 and annular region 54 being the largest near valve-closure element 20. This largest flow cross-section can also be provided in base plate 15, as shown in FIG. 5. In the downstream direction, the orifice width diminishes, e.g., in steps, with each new layer until the width of the narrow annular gap 50 in bottom layer 43 is reached.

Annular gap 50 is designed to have approximately similar diameter size as sealing ring 28 of valve-closure element 20. As a result, the available hydrostatic force for closing microvalve 1 profits from the entire pressure difference between the system pressure and the pressure prevailing outside of microvalve 1 and not just from part of this difference. Therefore, microvalve 1 is able to be closed more rapidly.

Figure 6:
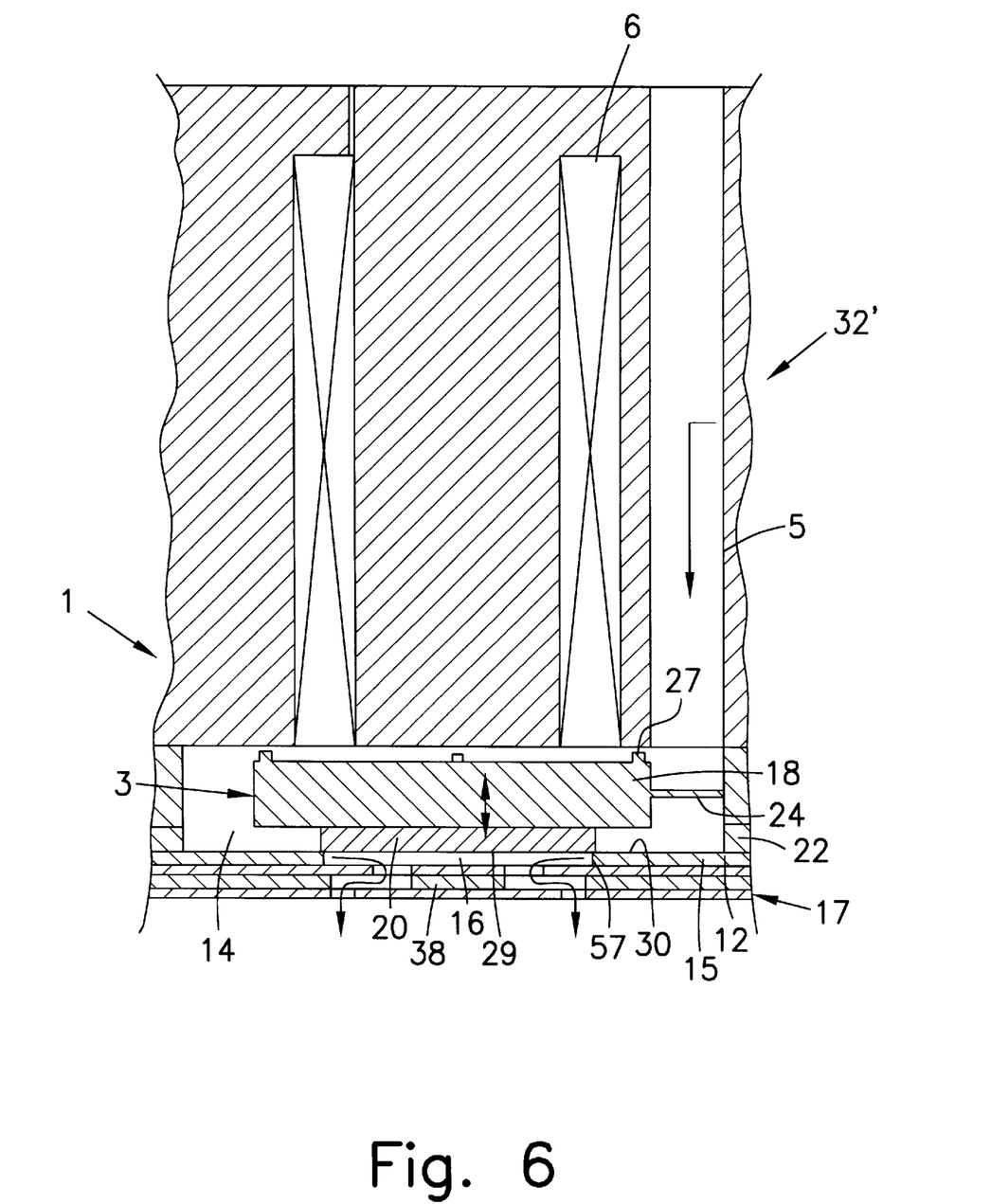
FIG. 6 shows a section through a sixth microvalve having an S-type spray-orifice plate.

FIG. 6 illustrates a microvalve 1 according to yet another embodiment of the present invention. In this microvalve 1, at least one channel 32' provided for supplying the fluid to the open area 14 of housing 12, in which actuating part 3 is moved axially, is configured parallel to longitudinal valve axis 8. Channel 32' runs, in this case, through pot magnet 5, e.g., over its full axial extent and then opens through into open area 14. Viewed in the circumferential direction, such a channel 32' can open through into open area 14 precisely where a spring element 24 follows downstream in open area 14. In this exemplary embodiment of microvalve 1, valve-closure element 20 does not have any sealing ring. Rather, in the closed state of microvalve 1, the plate-like valve-closure element 20 rests with its bottom end face 29 directly against the top face 30 (valve-seat surface) of base plate 15. However, the outside diameter of valve-closure element 20 is only slightly larger than the diameter of the central outlet orifice 16 in base plate 15, so that valve-closure element 20 abuts sealingly with only a small outer annular sealing area 57 against valve-seat surface 30. However, this annular sealing area 57, in turn, must be large enough to guarantee an absolute seal tightness on the closed microvalve 1. Microvalve 1 is also equipped with a spray-orifice plate 38 (S-type plate) similar to the third exemplary embodiment shown in (FIG. 3), the S-impact of the flow being indicated by arrows.

Another variant of an embodiment of microvalve 1 according the present invention includes a use of a permanent magnet. A permanent magnet arranged, e.g., on base plate 15 ensures that in the de-energized state of electromagnetic drive 2, armature 18 is pulled up with valve-closure element 20 toward valve-seat surface 30 and microvalve 1 is, thus, closed. If microvalve 1 is actuated, then pot magnet 5 pulls up armature 18 with valve-closure element 20 and thereby partially cancels out the effect of the permanent magnet. Microvalve 1 is now open. One can dispense with spring elements 24 in this exemplary embodiment.

Figure 7:
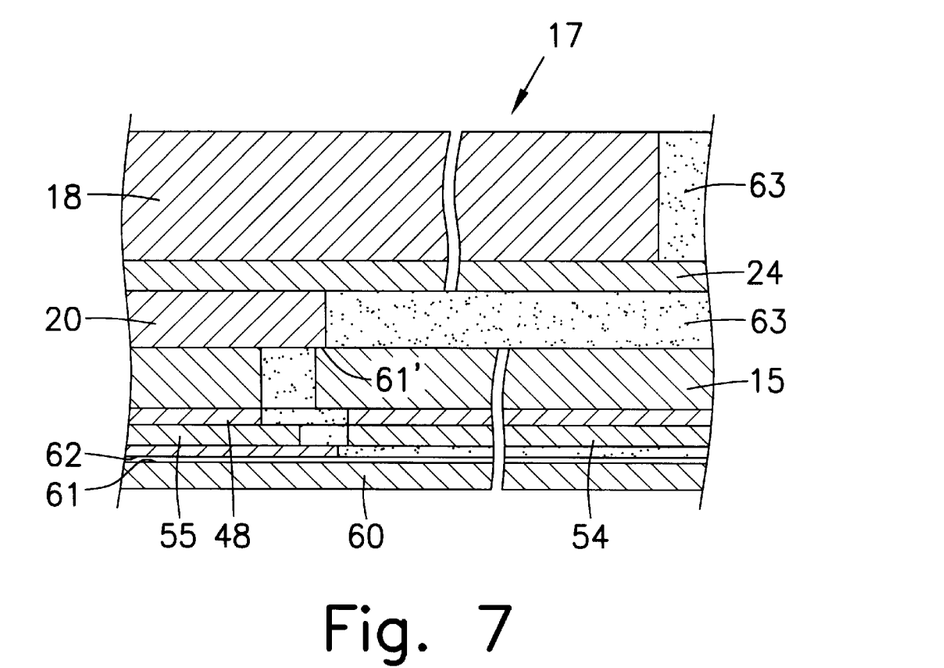
FIG. 7 shows, schematically, a process sequence for manufacturing a valve-closure element with an integrated annular-gap nozzle for a microvalve according to the present invention.
Figure 8:
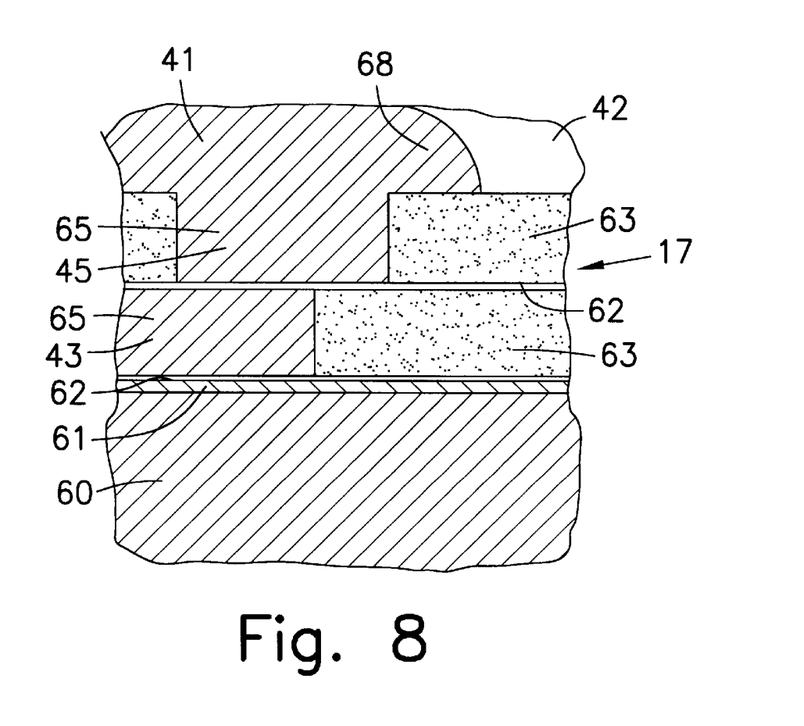
FIG. 8 shows, schematically, the process sequence of the lateral overgrowth action of electrodeposited layers for the microvalve.

An especially suited and preferred method according to the present invention for manufacturing microvalve 1 or lower valve part 17 is illustrated in FIGS. 7 and 8. FIGS. 7 and 8 do not exactly reproduce the exemplary embodiments illustrated in FIGS. 1 through 6 of lower valve part 17 with the corresponding, desired contours, but rather only those arrangements which clarify the manufacturing principle. However, the manufacturing process steps according to the present invention allow all exemplary embodiments to be manufactured at any time.

Because of the high demands placed on the structural dimensions and the precision of injection nozzles or injection valves, micropatterning (microstructuring) methods used for their commercial manufacturing are gaining in significance today. The present invention describes a method for manufacturing microvalves or individual microvalve components that is based on the successive application of photolithographic steps (UV depth lithography) and on the subsequent micro-electroplating process. The method according to the present invention ensures a high precision of the structures, even on a large-surface scale, so that it can be applied ideally to a large-scale production. A multiplicity of lower valve parts 17 for microvalves 1 can be produced simultaneously on one wafer (useful chip area) using the process steps according to the present invention.

The method starts out with a flat and stable substrate 60, which can be made, e.g., of metal (copper), silicon, glass or ceramic. The thickness of this substrate 60 usually lies between 500 $\mu$m and 2 mm; however, it has no effect on the subsequent process steps. After substrate 60 has been (scrubbed free of impurities) a metallic (e.g., Cu, Ti) or polymeric sacrificial layer 61 is applied by means of vapor deposition, sputter deposition, spin-on deposition, spray-on deposition or another suitable method. Following the complete batch processing of the useful chip (wafer) area, this sacrificial layer 61 is selectively removed, e.g., by means of etching, from substrate 60 to achieve a simple dicing and to lift off the components, thus, in this case (or operation) lower valve parts 17. A metallic galvanic starting layer 62 (e.g. Cu) is applied to sacrificial layer 61 by means of sputter deposition, vapor deposition, or by a wet-chemical treatment method (currentless electrodeposition).

Galvanic starting layer 62 is needed for electrical conduction process for the later micro-eletroplating process in which metallic layers are electrodeposited in patterned photoresist layers. Galvanic starting layer 62 can also be used directly as sacrificial layer 61.

After substrate 60 has been pretreated in this way, a photoresist 63, such as the one mentioned above, is applied over the entire surface in a next process step. To this end, three different variants, in particular, present themselves:

1. Lamination application of a non-removable resist at, e.g., about 100° C.;
2. Spin-on or spray deposition of a liquid resist; or
3. Spin-on or spray deposition of a polyimide in a liquid state.

Photoresist 63 is applied in this case in one or more layers.

After drying, photoresist 63 is present in a solid form in all three variants. Photoresist 63 usually corresponds in thickness to the metal layer, which should be realized in the electrodeposition process that follows later, thus, for example, should correspond, e.g., to the thickness of bottom layer 43 of spray-orifice plate 38 (FIG. 3). Typically, the aim is to have layer thicknesses of between 10 and 300 μm, depending on the desired thickness of the different layers of lower valve part 17. Thus, the layers of spray-orifice plate 38 are usually not as thick as, e.g., armature 18. The metal structure to be realized is supposed to be transferred inversely (as an inversion pattern) with the aid of a photolithographic mask in photoresist 63. It is possible here, on the one hand, for photoresist 63 to be exposed directly through the mask by means of UV irradiation (e.g., λ=200 nm to 500 nm) (UV depth lithography). Another possibility for patterning photoresist 63 provides for an oxide (e.g. $SiO_2$) or a nitride, which after being photolithographically patterned is used as a mask for a dry-etching process on photoresist 63. A laser ablation would also provide a solution, after the application of a mask, material of photoresist 63 being removed explosively with the help of a laser.

Following development of the UV-exposed photoresist 63 or application of the other mentioned methods (dry etching, ablation), a desired pattern that is predefined by the mask is produced in photoresist 63. This pattern in photoresist 63 serves as a negative pattern for the later metallic layer 43 of spray-orifice plate 38 (FIG. 3). In the other exemplary embodiments as well, it is analogously a question of the bottom layer at the time, with which the build-up of the layered lower valve part 17 begins. In the electrodeposition process step that follows at this point, a metal 65 or a metallic alloy is deposited out of an acqueous electrolyte into the resulting resist trenches. As a result of the electrodeposition, metal 65 is placed closely against the contour of the negative pattern of photoresist 63, so that the predefined contours can be reproduced true to form in metal 65. To produce multi-layer structures, the height level of the galvanic layer of metal 65 should correspond to the height of photoresist 63. Which deposition material is selected depends on the specific layer requirements, factors such as mechanical strength, chemical resistance, weldability, and others being especially significant. Usually, Ni, NiCo, NiFe, Cu, Fe, Co, Zn or Au are used; however other metals and alloys are also conceivable.

To realize the structure of the complete lower valve part 17, the steps starting with the deposition of galvanic starting layer 62 must be repeated in conformance with the number of desired layers. Thus, following the resist patterning, the individual metal layers are repeatedly deposited on one another and are held together by means of metallic adhesion. It is possible for different metals 65 to be used as well for the layers and components of a lower valve part 17, so that it is by no means necessary for, e.g., armature 18 and spray-orifice plate 38 to be made of the same material. Prior to the next electrodeposition of metal, other adhesion-promotor layers produced, e.g. through PVD (physical vapor deposition) or a wet chemical treatment, can be applied, in addition to galvanic starting layers 62, to photoresist 63 and/or to the preceding metallic layer, through which means the quality of the bond joining the individual layers to one another can be improved.

The lower valve parts 17 are subsequently diced. Thus, sacrificial layer 61 is etched away, through which means lower valve parts 17 are lifted off from substrate 60. The galvanic starting layers 62 are subsequently removed by means of etching, and the remaining photoresist 63 is dissolved out of the metal patterns. This can be achieved, e.g., by means of a KOH treatment or through an oxygen plasma, or by means of solvents (e.g. acetone) in the case of polyimides. These processes of dissolving out photoresist 63 are generally known as "stripping". It is likewise conceivable to mechanically loosen substrate 60, e.g. by means of magnets, given a properly selected galvanic starting layer 62. A dicing by means of ultrasound is just as feasible.

It is clearly shown in FIG. 7 that it is especially beneficial for the metallic layer for spring elements 24 to be deposited between armature 18 and valve-closure element 20. This metallic layer projects out radially in some areas radially over the outer boundary edge of armature 18 in conformance with the desired number of spring elements 24. If the intention is to manufacture structures with slanted or rounded side walls, this can be done through a "lateral overgrowth" 68 method. In this method, two desired layers of lower valve part 17 can be formed in one step by means of electrodeposition. FIG. 8 illustrates lateral overgrowth 68 on the basis of two layers denoted by reference numerals 41 and 45. Metal 65 to be galvanically deposited initially grows in the known form around photoresist pattern 63 of layer 45 up to the top edge of photoresist 63 and then beyond photoresist 63. The overgrowth 68 of photoresist pattern 63 is formed in the horizontal and vertical direction, roughly in the same order of magnitude. This partial overgrowth 68 replaces the application of an additional galvanic starting layer 62 on photoresist 63 and of a next galvanic layer, per se, since two layers 45, 41 of lower valve part 17 are produced in one electrodeposition step. In this manner, inlet orifices 42 can be produced very selectively, e.g., in top layer 41 of spray-orifice plate 38 shown in (FIG. 3). The lateral overgrowth 68 forming must be stopped at certain times to obtain the desired orifice sizes. On the other hand, another photoresist layer 63 at the axial height of overgrowth 68 can also be provided, which, in the final analysis, is used as a stop means for the lateral overgrowth 68 of layer 41 and guarantees a precisely defined size for inlet orifices 42.

To separate those structures, which later are required to be movable relatively to each other (see FIG. 5), a suitable sacrificial layer 61' is applied at the spots to be separated, as shown in FIG. 7. This can be, in particular, a titanium or copper layer produced through PVD, which, prior to the deposition of the following metallic layer that will later belong to the movable part (nozzle area 55) of microvalve 1, is applied to the preceding layer of the later non-removable annular region 54.

Prior to or subsequent to the removal of sacrificial layers 61, 61' of galvanic starting layers 62 or of photoresist 63, the necessary bonding processes (e.g., adhesion, welding, soldering) can be undertaken to join lower valve part 17 and pot magnet 5.

What is claimed is:

1. A microvalve having a plurality of at least partially bonded, stacked layers, at least one of the plurality of layers being at least partially made of a metallic material, the microvalve comprising:

an electromagnetic drive; and a multilayer lower valve part separate from the electromagnetic drive, the multilayer lower valve part including at least one armature, a valve-closure element, a valve-seat surface, at least one inlet and at least one outlet, each of which being produced using an electrodeposition process, wherein the valve-seat surface communicates with the valve-closure element and is positioned between the at least one inlet and the at least one outlet, the valve-closure element being deflectable using the electromagnetic drive.

2. The microvalve according to claim 1, further comprising:

a saucer-shaped housing defining the multilayer lower valve part, the saucer-shaped housing including at least one base plate and an annular inner wall, the multilayer lower valve part having an open area being at least partially surrounded by the saucer-shaped housing, wherein the at least one inlet extends into the open area and the at least one outlet extends out of the open area.

3. The microvalve according to claim 2, wherein the armature and the valve-closure element are positioned in the open area of the multilayer lower valve part.

4. The microvalve according to claim 2, wherein the at least one base plate of the saucer-shaped housing provides the valve-seat surface for communicating with the valve-closure element.

5. The microvalve according to claim 2, wherein the at least one armature and the valve-closure element form a movable actuating part, the movable actuating part being coupled to the inner wall of the saucer-shaped housing with at least one spring element.

6. The microvalve according to claim 1, wherein the at least one armature has a first diameter and the valve-closure element has a second diameter, the first diameter being larger than the second diameter.

7. The microvalve according to claim 2, wherein the at least one base plate of the saucer-shaped housing includes a spray-orifice plate having at least one spray orifice.

8. The microvalve according to claim 2, wherein the at least one base plate of the saucer-shaped housing includes a multi-layer spray-orifice plate, the at least one inlet orifice being eccentrically positioned with at least one outlet orifice, the at least one inlet being radially offset from the at least one outlet.

9. The microvalve according to claim 2, wherein the at least one base plate of the saucer-shaped housing includes an annular-gap nozzle having an uninterrupted annular gap, the uninterrupted annular gap corresponding to the at least one outlet.

10. The microvalve according to claim 2, wherein the saucer-shaped housing includes a fixed part having an outer annular region, and wherein the multilayer lower valve part includes an actuating part and an inner nozzle region secured to the actuating part, the at least one base plate of the saucer-shaped housing being formed from the outer annular region and the inner nozzle region.

\* \* \* \* \*

UNITED STATES PATENT AND TRADEMARK OFFICE
CERTIFICATE OF CORRECTION

PATENT NO. : 5,924,674
DATED : July 20, 1999
INVENTOR(S) : Hahn et al.

It is certified that error appears in the above-identified patent and that said Letters Patent is hereby corrected as shown below:

ON THE TITLE PAGE:

Abstract, line 1, delete "according to the invention is comprised of" and insert -- includes --.

Column 2, line 66, after "Drive 2" delete "is".

Column 3, line 62, delete "insert" and insert -- present invention --.

Signed and Sealed this

Tenth Day of October, 2000

*Attest:*

Q. TODD DICKINSON

*Attesting Officer*  *Director of Patents and Trademarks*